United States Patent
Sue et al.

(10) Patent No.: US 12,415,890 B2
(45) Date of Patent: Sep. 16, 2025

(54) POLY(ARYL ETHER KETONE) COMPOSITIONS CONTAINING CARBON-BASED NANOMATERIALS

(71) Applicant: The Texas A&M University System, College Station, TX (US)

(72) Inventors: Hung-Jue Sue, College Station, TX (US); Cong Liu, College Station, TX (US); Sinan Feng, Jilin (CN)

(73) Assignee: The Texas A&M University System, College Station, TX (US)

( * ) Notice: Subject to any disclaimer, the term of this patent is extended or adjusted under 35 U.S.C. 154(b) by 197 days.

(21) Appl. No.: 17/519,270

(22) Filed: Nov. 4, 2021

(65) Prior Publication Data

US 2022/0135740 A1     May 5, 2022

Related U.S. Application Data

(60) Provisional application No. 63/110,294, filed on Nov. 5, 2020.

(51) Int. Cl.
| | |
|---|---|
| *C08G 65/40* | (2006.01) |
| *C08G 65/48* | (2006.01) |
| *C08J 5/18* | (2006.01) |
| *C08K 3/04* | (2006.01) |

(52) U.S. Cl.
CPC ..... *C08G 65/4025* (2013.01); *C08G 65/4031* (2013.01); *C08G 65/48* (2013.01); *C08J 5/18* (2013.01); *C08K 3/041* (2017.05); *C08J 2371/10* (2013.01)

(58) Field of Classification Search
CPC ................................ C08G 65/48; C08K 3/041
See application file for complete search history.

(56) References Cited

FOREIGN PATENT DOCUMENTS

| CN | 102321338 A | * | 1/2012 | ............. B29C 47/92 |
| CN | 105860431 A | * | 8/2016 | ............. B33Y 70/00 |
| CN | 108752920 A | * | 11/2018 | |

OTHER PUBLICATIONS

Machine translation of CN-108752920-A (Year: 2018).*
Machine translation of CN-105860431-A (Year: 2016).*
Diez-Pascual et al (High performance PEEK/carbon nanotube compsites compatibilized with polysulfones-I. Structure and thermal properties, Carbon 48 (2010) 3485-3499 (Year: 2010).*
Machine translation of CN-102321338-A (Year: 2012).*

* cited by examiner

*Primary Examiner* — Wenwen Cai
(74) *Attorney, Agent, or Firm* — CHRISTENSEN O'CONNOR JOHNSON KINDNESS PLLC (57) ABSTRACT

Compositions comprising a poly(aryl ether ketone) (PAEK) having a carbon-based nanomaterial dispersed therein, wherein the composition includes at least 1 weight percent carbon-based nanomaterial based on the total weight of the composition, products that include the compositions, and methods for making the compositions and products.

14 Claims, 10 Drawing Sheets

POLY(ARYL ETHER KETONE) COMPOSITIONS CONTAINING CARBON-BASED NANOMATERIALS

CROSS-REFERENCE TO RELATED APPLICATION

This application claims the benefit of U.S. Application No. 63/110,294, filed Nov. 5, 2020, expressly incorporated herein by reference in its entirety.

BACKGROUND

Polyether ether ketone (PEEK) is a high-performance engineering plastic that has been widely utilized in many harsh environment applications, including aerospace, automotive, structural, high temperature electrical, oil and gas drilling, and biomedical fields. Because of its aromatic backbone structure and semi-crystalline nature, PEEK exhibits superior mechanical properties, thermal stability, and chemical resistance. PEEK is a member of a broader class of polymers (poly aryl ether ketones or PAEKs) that contain aryl ethers and aryl ketones in the backbone.

Introduction of nanoparticles to PAEK matrices for greatly improved mechanical and functional properties have been extensively pursued during the past decades. Carbon nanotubes (CNTs) have attractive properties as reinforcement agents for enhancing polymer properties due to their high modulus, high strength, and excellent electrical and thermal conductivities. Many successful examples of CNT-based polymer nanocomposites exhibit greatly improved stiffness, strength, and toughness. In the case of PEEK/CNT nanocomposites, most of the anticipated property improvements remain unrealized because of the extreme difficulty in preparing well-dispersed CNTs in PEEK. If CNTs can be well-dispersed in PEEK, great enhancements in mechanical properties and electrical conductivity may become achievable.

Melt blending is a preferred process to prepare thermoplastic nanocomposites. However, it is difficult to disperse nanoparticles, such as carbon nanotubes, graphene, and related carbon-based nanomaterials, through melt blending due to the strong attractive forces between individual nanoparticles. Increasing processing temperature and shear rate may facilitate nanoparticle dispersion but might also cause polymer decomposition and breakage of nanoparticles (e.g., CNTs). On the other hand, solvent-assisted nanoparticle dispersion has been shown to be an effective way to achieve good dispersion of nanoparticles in polymer matrices. Unfortunately, since PEEK possesses excellent chemical resistance and high melting temperature, choices of suitable solvents to facilitate nanoparticle (e.g., CNTs) dispersion in PEEK become extremely limited. Commonly used solvents include sulfuric acid and methanesulfonic acid, which can dissolve PEEK at room temperature. However, the same acids are believed to also promote PEEK chains to undergo sulfonation. Consequently, the pendant sulfonic acid groups would prevent PEEK from crystallization, which will in turn cause deterioration of the physical and thermal properties of PEEK. Some solvents with high boiling points are also reported to be effective in dissolving a low concentration of PEEK at higher temperatures (200-300° C.). Unfortunately, those solvents are not suitable for dispersing CNTs. Thus, it remains a challenge in dispersing nanoparticles (e.g., CNTs) in PEEK through the commonly known approaches.

Chemical and physical functionalization of CNTs have been widely practiced to facilitate CNT dispersion in polymer matrices. Chemical functionalization introduces functional groups onto CNTs through covalent bonding to substantially improve its interaction with the polymer matrix. However, this method could significantly compromise the intrinsic mechanical, electrical and thermal properties of CNTs. For PEEK/CNT nanocomposites, decrease in thermal stability of the functionalized CNTs could lead to CNT degradation during high temperature processing. Hence, physical functionalization of pristine CNTs is usually a preferable approach for the preparation of multifunctional PEEK nanocomposites. Polymer wrapping is commonly practiced for dispersing CNTs in a polymer matrix, which could overcome the van der Waals attraction between CNTs through electrostatic/steric repulsive forces. Due to the high processing temperature of PEEK, only few polymers can be utilized to wrap CNTs and gain an improved dispersion in PEEK. Instead of utilizing surfactants or conjugated polymers, most studies chose polyethersulfone (PES) or polyetherimide (PEI) as the wrapping polymer since they possess good affinity and comparable thermal stability to PEEK. However, the introduction of these amorphous polymers as the wrapping surfactants leads to reduction of PEEK crystallinity. Therefore, it is desirable to prepare PEEK nanocomposites without any introduction of surface modifiers and chemical functionalization of CNTs.

For semi-crystalline polymers, CNT-anchored crystallization may be considered as a form of surface functionalization for the preparation of polymer nanocomposites. Indeed, this same idea has been demonstrated in various semi-crystalline polymer nanocomposites. These polymer crystal-decorated CNTs can be prepared from isothermal crystallization on CNT surfaces in a highly diluted solution. CNTs act as a nucleation agent to facilitate heterogeneous nucleation of polymer crystals on CNT surface. This approach effectively improves the dispersity of CNTs in the same polymer without a need to modify CNT surface. Much effort has been devoted to elucidating the corresponding crystallization mechanism as well as fabricating polymer nanocomposites for a wide variety of multi-functional applications. It is noted that the necessary condition for the above approach to work requires a suitable solvent for polymer crystallization on the well-dispersed CNT surfaces, which remains to be a challenge in the preparation of PAEK/CNT nanocomposites.

Despite the advancements in the developments in the preparation of PAEK/CNT nanocomposites, a need exists for new and improved methods for preparing PAEK/CNT nanocomposites. The present invention seeks to fulfill this need and provides further related advantages.

SUMMARY

In one aspect, the invention provides a composition comprising a poly(aryl ether ketone) (PAEK) having a carbon-based nanomaterial (e.g., carbon nanotube, graphene) dispersed therein, wherein the composition includes at least 1 weight percent carbon-based nanomaterial based on the total weight of the composition.

In certain embodiments, the composition is prepared by forming a homogeneous mixture of a poly(aryl ether ketone) ketimine derivative and a carbon-based nanomaterials (e.g., carbon nanotube, graphene) and treating the mixture with an aqueous acid to hydrolyze the poly(aryl ether ketone) ketimine derivative to provide a poly(aryl ether ketone) composition having the carbon-based nanomaterials dispersed therein.

In certain of these embodiments, treating the mixture with an aqueous acid to hydrolyze the poly(aryl ether ketone) ketimine derivative comprises hydrolyzing substantially all of the ketimine groups to provide a poly(aryl ether ketone) composition having substantially no ketimine groups. In other of these embodiments, treating the mixture with an aqueous acid to hydrolyze the poly(aryl ether ketone) ketimine derivative comprises hydrolyzing a portion of the ketimine groups to provide a poly(aryl ether ketone) composition having ketimine groups (e.g., up to about 30% ketimine retained).

In certain embodiments, the poly(aryl ether ketone) is (poly(ether ketone) (PEEK).

In certain embodiments, the carbon-based nanomaterial is a carbon nanotube, graphene, or a mixture thereof. In certain embodiments, the carbon nanotube is a multi-walled carbon nanotube.

In certain embodiments, the composition comprises at least about 5, at least about 10, at least about 20, at least about 25, at least about 30, at least about 40, or at least about 50 weight percent carbon-based nanomaterial based on the total weight of the composition.

In certain embodiments, the composition has a Young's Modulus at 25° C. (GPa) that is at least about 50-90% greater than for PEEK.

In certain embodiments, the composition has a tensile strength at 25° C. (MPa) that is at least about 50-105% greater than for PEEK.

In certain embodiments, the composition has a Young's Modulus at 260° C. (GPa) that is at least about 100-500% greater than for PEEK.

In certain embodiments, the composition has a tensile strength at 260° C. (MPa) that is at least about 100-500% greater than for PEEK.

In certain embodiments, the composition (e.g., thin film) has an electrical conductivity in S/m that is at least about 100-500% greater than for PEEK (thin film).

In certain embodiments, the composition is in the form of particle having a median particle size from about 1 to about 2 μm. In certain of these embodiments, the median particle size is less than about 10 μm).

In other embodiments, the composition is in the form of a molded product.

In further embodiments, the composition is in the form of a thin film.

In another embodiment, the invention provides a molded product comprising the PAEK composition described herein.

In a further embodiment, the invention provides a 3D-printed product comprising the PAEK composition described herein.

In another embodiment, the invention provides a blended polymer product, comprising the PAEK composition described herein. In a related embodiment, the invention provides the use of the blended polymer product for further blending (e.g., diluting) with a polymer to provide a composition having less than about 50 wt % carbon-based nanomaterial.

In another aspect, the invention provides a method for making a composition comprising a poly(aryl ether ketone) (PAEK) having a carbon-based nanomaterial (e.g., carbon nanotubes, graphene) dispersed therein. In certain embodiments, the method comprises:

(a) forming a homogeneous mixture of a poly(aryl ether ketone) ketimine derivative and a carbon-based nanomaterial; and (b) treating the mixture with an aqueous acid to hydrolyze at least a portion (at least about 70%) of the poly(aryl ether ketone) ketimine derivative to provide a poly(aryl ether ketone) composition having a carbon-based nanomaterial dispersed therein.

In certain embodiments, the homogeneous mixture is prepared in a solvent selected from N-methylpyrrolidone (NMP), N,N-dimethylacetamide (DMAC), N,N-dimethylformamide (DMF), dimethylsulfoxide (DMSO), chlorinated solvents (methylene chloride ($CH_2Cl_2$) and tetrachloroethylene), aromatic solvents (benzene, toluene, and xylene), ketones (acetone, 2-butanone, and methyl isobutyl ketone), and ethers (diethyl ether and tetrahydrofuran).

The method of the invention is useful for making the PAEK (e.g., PEEK) compositions described here. In certain embodiments, the method provides PAEK compositions comprising a carbon-based nanomaterial (e.g., carbon nanotubes, graphene) dispersed therein in an amount that is at least about 0.5, about 1, about 2, about 5, about 10, about 15, about 20, about 25, about 30, about 40, or about 50 weight percent based on the total amount of the composition.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

FIG. 9 compares electrical conductivity curves of a representative PEEK/MWCNT nanocomposites of the invention with other PEEK/MWCNT nanocomposites: Ref. 55, Mohiuddin, M. et al., *Compos Sci Technol Compos Sci Technol* 2011, 72 (1), 21-27; Ref. 56, Martin, A. C. et al., *Compos Sci Technol Compos Sci Technol* 2013, 89, 110-119;

Ref. 57, Bangarusampath, D. S. et al., *Chemical Physics Letters* 2009, 482 (1), 105-109; and Ref. 58, Na, R. et al., *RSC Advances* 2018, 8 (6), 3296-3303.

DETAILED DESCRIPTION

In one aspect, the invention provides a method for the preparation of PEEK/CNT nanocomposites with high CNT loadings. The method utilizes reversible chemical modification of PEEK, in which a bulky substituent is incorporated into the PEEK structure to provide an amorphous PEEK precursor that is soluble in a variety of common organic solvents at room temperature. Subsequently, the bulky substituent is removed to recover the PEEK structure.

In the method, high loading of multi-walled CNT (MWCNT) in PEEK was achieved by homogeneous solution mixing of PEEKt (a soluble ketimine derivative of PEEK) and pristine MWCNT in N-methyl-2-pyrrolidone (NMP), followed by reducing PEEKt to PEEK in the presence of MWCNT to result in solvent-induced crystallization of PEEK on MWCNT. The PEEK/MWCNT specimens for testing and characterization were then prepared by sintering and molding. In this fashion, high-quality PEEK/MWCNT nanocomposites having a high content of individually dispersed MWCNT up to 50 wt % were prepared. The PEEK/MWCNT nanocomposites exhibit greatly improved tensile properties and electrical conductivity.

Using a novel manufacturing process, the present invention provides compositions having multiwall carbon nanotubes (MWCNTs) at levels of 20 wt % or more dispersed in poly(aryl ether ketones) (PAEKs). The result is a plastic formulation that can be melt processed that has unprecedented performance advantages compared to PEEK. At 275° C. the modulus of PEEK with 20 wt % MWCNT is 4.25 times higher than that of the neat polymer and the coefficient of thermal expansion (CTE) is dramatically lower (42.3 vs 166 ppm/° C.). This material also has excellent electrical conductivity (91.2±1.6 S/m at 10 wt %; 951.8±0.4 S/m at 20 wt %; 2205±5 S/m at 50 wt %).

The composition of the invention includes PAEK (e.g., PEEK) polymers and nanoparticles (e.g., carbon nanotubes, graphene, carbon fibers, and/or other carbon-based nanomaterials) substantially individually dispersed in the composition.

As used herein, the term "individually dispersed in the composition" refers to the nanoparticles being substantially isolated from each other by the polymer component of the composition. The advantageous mechanical and electrical properties of the compositions described here, as well as the advantageous mechanical and electrical properties of the products described herein that include these compositions, are a result of effective dispersion of the carbon-based nanomaterials in the polymers.

PAEKs are polymers that have the following repeat units: phenylene groups (meaning aromatic $C_6H_4$ diradicals), ether or thioether groups, and ketones. Representative commercially available polymers are (-Ph-O-Ph-O-Ph-CO-)n, (-Ph-O-Ph-CO-Ph-CO-)n, (-Ph-O-Ph-CO-)n, which are often referred to as PEEK, PEKK, and PEK, respectively. In these polymers the phenylene groups are ortho or para-disubstituted. Other examples are listed here: Mullins, M. J. & Woo, E. P., J. Macromolecular Science, 27:2, 313-341 (1987).

Carbon nanotubes (CNTs) are nano-sized tubes with diameters less than 100 nanometers. There are many variants such as single-walled CNTs (SWCNTs) and multi-walled CNTs (MWCNTs). There are several commercial sources of CNTs. They vary in purity, with transition-metal contaminants, and also distributions of length, diameter, agglomerate size, and other factors. For most applications, pure SWCNTs with average lengths greater than 1 μm are most desirable. These exhibit high modulus and conductivity at relatively low loading levels. However, SWCNTs are generally considerably more expensive. For a review that describes CNTs, preparation methods, and properties see de Wolder, M. F. L., et al, Science, Vol 339, 535-539.

Graphene, like CNTs, is an allotrope of carbon with a sheet-like structure. It is prepared by exfoliating graphite by a variety of methods (Paton, K. R., Nature Materials, Vol 13, 624-630, 2014). Because it also has a high aspect ratio (length or width divided by thickness) and excellent conductivity, it is a promising filler to improve the conductivity of thermoplastics. The challenge has been to mix graphene in highly viscous thermoplastics and achieve adequate dispersion.

The first step of the process is to mix CNTs with a solution of an imine-derivative of a PAEK PAEK-ketimine, also known as poly(aryl ether ketimines). These ketimine polymers have the same repeat unit as PAEKs except that the ketone (—CO—) is replaced with a ketimine (—CNR—) where 'R' is an aliphatic or aromatic group such as phenyl, methyl, ethyl, benzyl, or phenethyl.

The preparation of PAEK-ketimines has been described by Roovers, J., Macromolecules, 23, 1611-1618. In a typical procedure a ketimine monomer, such as the aniline imine derivative of bis(4-fluorophenyl)-ketone, is reacted with an alkali metal salt of an aromatic diol such as hydroquinone. Polar aprotic solvents such as N-methylpyrrolidone (NMP) are typically used.

These polymers are much more soluble in common solvents compared to PAEKs. Suitable solvents are N-methylpyrrolidone (NMP), N,N-dimethylacetamide (DMAC), N,N-dimethylformamide (DMF), dimethylsulfoxide (DMSO), chlorinated solvents such as methylene chloride ($CH_2Cl_2$) and tetrachloroethylene, aromatic solvents such as benzene, toluene, and xylene, ketones such as acetone, 2-butanone, and methyl isobutyl ketone, ethers such as diethyl ether and tetrahydrofuran. The solutions of PAEK-ketimines are combined with the CNTs or graphene and mixed. Suitable mixers are magnetic lab stirrers, paddle or propeller stirrers, ultrasonic mixers, and high-shear mixers of various sorts (inline rotors, rotor-stator mixers). The low-shear mixing processes described in the Examples gave adequate dispersion of the CNTs, but better results might be achievable with high-shear mixing.

The next step is the chemical removal of the amine group from the PAEK-ketimine. This is essentially a hydrolysis reaction that forms amine. For example, in the case of a phenyl ketimine, aniline is formed as a coproduct. Various catalysts can be used, typically acids or salts. In the case of acids such as aqueous HCl, a stoichiometric amount of acid converts the amine to an ammonium salt. It is possible to partially hydrolyze the ketimine either by using a deficiency of acid or by shortening the reaction time. This produces a copolymer of PAEK with a mixture of ketones and ketimines. As the ketimines are converted to ketones the polymer precipitates and crystallizes on the CNTs or graphene, causing them to co-precipitate. The solid PAEK-CNT composite is purified by washing with water and/or aqueous acid. This washing process removes amine and some residual solvent. The solid is collected by filtration and dried.

The properties of the composites made using this process are significantly better than those prepared by melt-mixing PAEKs with CNTs. We speculate that this is because the CNTs disperse well in the PAEK-ketimine solution due to low viscosity and better wetting of the CNTs by the solution (compared to the interaction of molten PAEK with CNTs). The CNTs serve as a nucleation site for PAEK crystallization. The crystallization/precipitation process causes the PAEK to surround the CNTs, preventing aggregation of the dispersed nanotubes. As a consequence of this better dispersion, mechanical properties such as modulus and electrical conductivity are substantially better than previous reported. Also, we are able to achieve higher loadings of CNTs (up to 50 wt %). Above 50 wt % CNT, it becomes difficult for forming good quality plaques. However, if the composition can be used as a masterbatch and it is possible to increase the CNT loading above 50 wt %.

The compositions described herein are useful for replacement of metals where light weight and conductivity (anti-lightning strike shield) are required for aerospace applications, electrical and electronic components, semiconductor handling trays, and subsea downhole drilling components, among others. The compositions described herein are useful for applications that require stability and wear resistance at high temperatures in corrosive environments such as seals and bearings in turbines and pumps, and chemical reactors. The compositions described herein can be used as high-performance structural components serviced in harsh environments.

The compositions described herein will compete with metals in many 'engineering' applications. The materials of the present invention have a cost/performance advantage in corrosive environments, where weight is critical, and for parts that can be fabricated less expensively using molding processes such as injection or compression molding. Regarding bearings and seals, the materials of the present invention compete with conventional filled thermoplastics (such as PAEKs) and elastomers. The compositions described herein have improved lifetimes at high temperatures (>150° C.) in corrosive environments such as aqueous salt.

Figure 1:
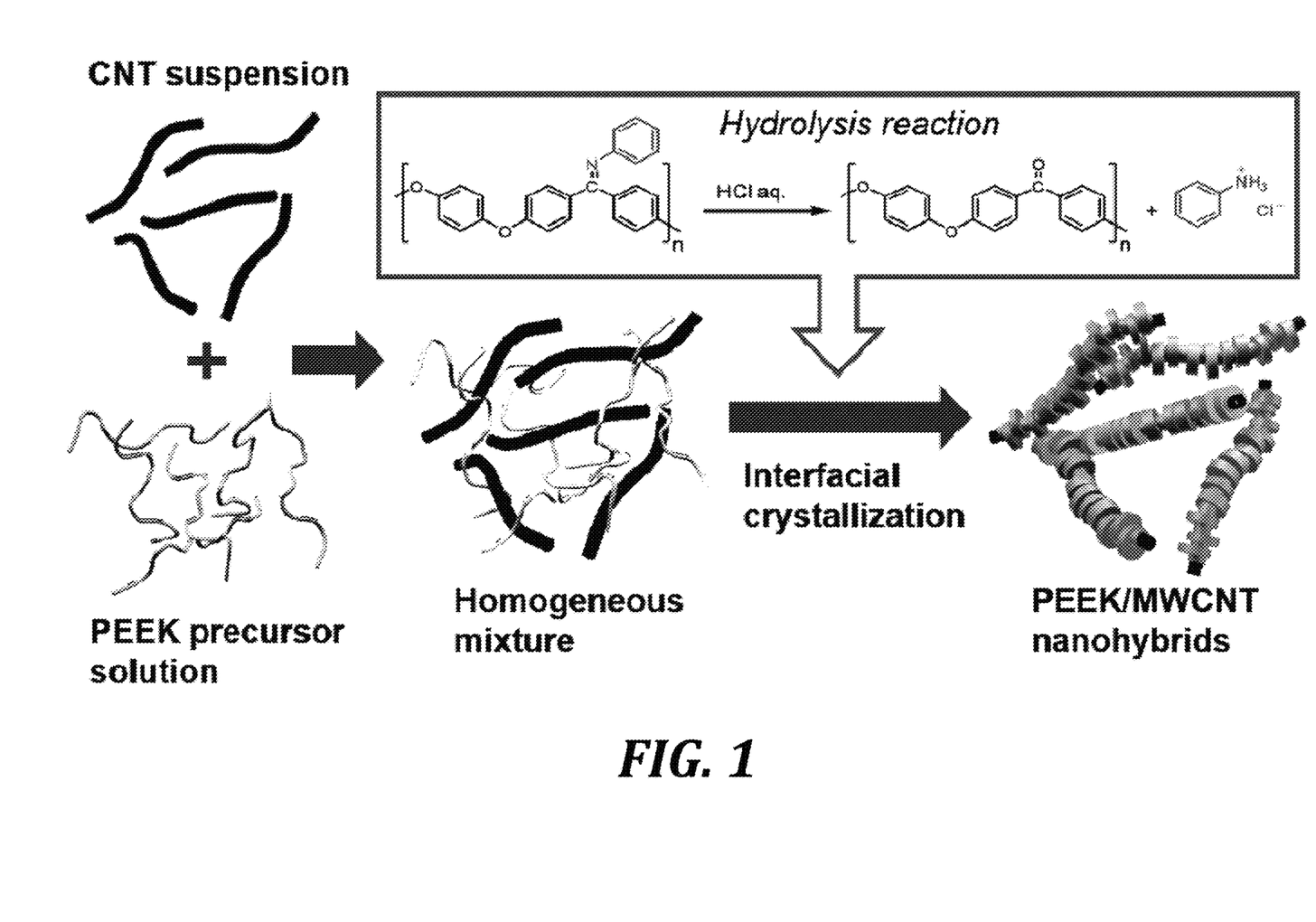
FIG. 1 is a schematic illustration of the preparation of representative PEEK/MWCNT nanocomposites in accordance with the method of the invention.
Figure 2A:
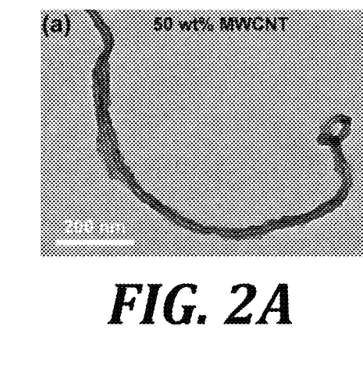
FIGS. 2A-2H are TEM images of representative PEEK/MWCNT nanocomposites of the invention having different levels of MWCNT loadings (50, 20, 5, and 0.5 wt %).
Figure 2B:
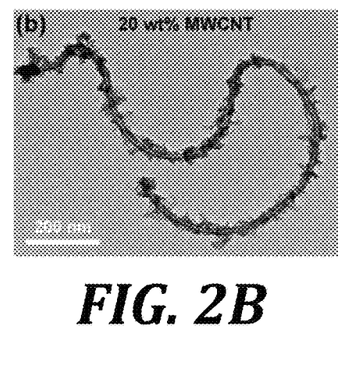
Figure 2C:
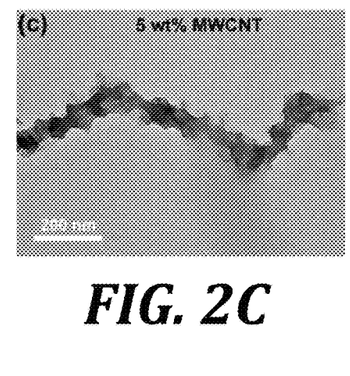
Figure 2D:
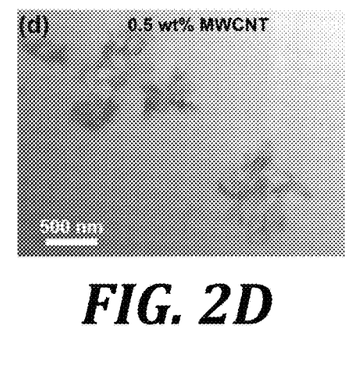
Figure 2E:
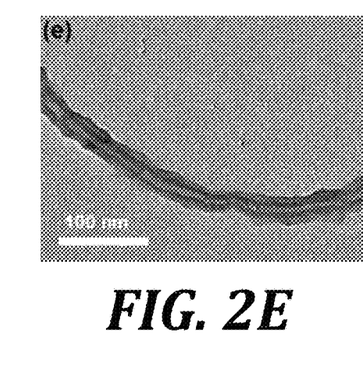
Figure 2F:
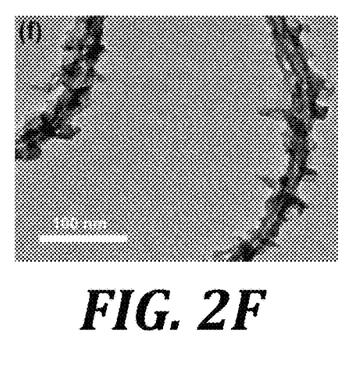
Figure 2G:
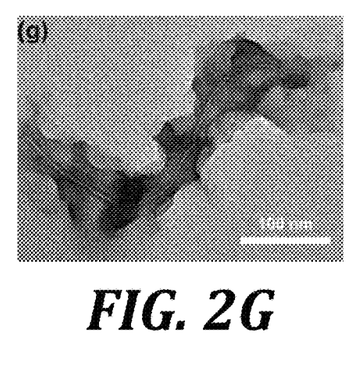
Figure 2H:
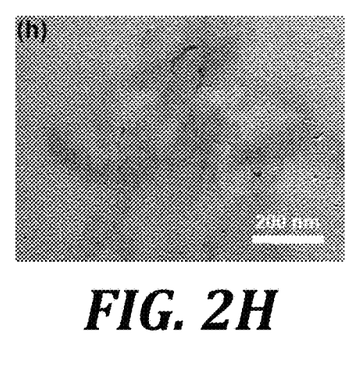

The obtained PEEKt shows good solubility in various common organic solvents, including THF, DMF, $CHCl_3$, NMP. SEC results reveal that PEEKt possesses Mw=54.1 kg/mol and PDI=2.4, indicating that the molecular weight of PEEKt is comparable to that of a typical commercial PEEK. According to the earlier literature, PEEKt precursor with Schiff base structure can be hydrolyzed to regenerate PEEK. During the hydrolysis, PEEK will crystallize and precipitate in the solution. This PEEK precursor solution approach can be readily conducted in various organic solvents at room temperature, which shows significant advantages over the solution crystallization of PEEK using acids or high boiling point solvents. The precipitated PEEK powders exhibit a spherical shape with diameters of 2-10 µm. The powders also show strong birefringence under polarized light, indicating their crystalline nature. DSC study reveals that the regenerated PEEK possessed a glass transition temperature (Tg) of 147° C. and a melting point of 343° C. Analysis of XRD patterns for PEEKt and PEEK also indicates that the characteristic peaks of PEEK has emerged after the conversion. These results demonstrate that an amorphous PEEKt polymer can be completely converted into a semi-crystalline PEEK structure through a hydrolysis reaction. MWCNTs have been considered as an effective nucleation agent during polymer crystallization in both solution and melt states. To achieve good dispersion of MWCNT in PEEK, the MWCNT-induced crystallization of PEEK in a solvent was carried out, as shown in FIG. 1). Before mixing with the PEEKt solution, MWCNTs need to be well dispersed in a solvent of choice to maintain an agglomeration-free state. As described herein, NMP was selected since NMP has been reported to be a good solvent for MWCNTs. As expected, PEEKt and MWCNTs with various designated concentration ratios were well mixed to yield a homogeneous suspension in NMP. The subsequent PEEKt to PEEK conversion and crystallization in presence of MWCN was carried out following the same procedure as that of the PEEKt to PEEK conversion process.

TEM was utilized to carry out the morphological analysis of PEEK/MWCNT nanohybrid since OM does not have sufficient resolution to do so. The PEEK/MWCNT in the NMP solution was diluted to allow for droplets of individually dispersed PEEK/MWCNT to be deposited on a copper grid for TEM observation. The regenerated PEEK after drying is shown as spherical particles with diameters of 2-10 µm, while the PEEK/MWCNT after evaporated from NMP becomes much smaller in size and exhibit unique morphological features depending on the MWCNT concentration in PEEK (FIG. 2). As described herein, heterogeneous nucleation of PEEK crystals occurs on the surface of MWCNTs. With a MWCNT loading of 50 wt % in PEEK, only a thin PEEK layer of about 6 nm is deposited on the surface of MWCNTs (FIG. 1A). As MWCNT loading is decreased to 20%, available PEEK begins to crystallize on the MWCNT surface and form shish-kebab structures (FIG. 1B). Finally, as MWCNT concentration is further decreased, the crystalline PEEK would space-fill the entire region between the shish-kebab structures (FIGS. 1C and 1D). This shish-kebab structure formation phenomenon on CNT in a solution has been widely reported in literature for a variety of semicrystalline polymers. It has been hypothesized that the MWCNT induced crystallization was attributed to a soft epitaxy mechanism as follows. Initially, polymer chains are adsorbed onto the MWCNT walls and oriented along the axis due to their geometric preference to maximize molecular contact. Afterwards, subsequent chains would deposit along to nucleate polymer crystals and form shish-kebab structure perpendicular to the MWCNT axis. To the best of our knowledge, this work is the first to demonstrate the formation of the shish-kebab structure by MWCNT induced crystallization of PEEK.

High-resolution TEM (HRTEM) was utilized to investigate the morphological details of PEEK/MWCNT hybrid. The wall structure of MWCNT can be observed clearly which consists 15-20 graphene layers. However, few PEEK crystalline domains are distinguishable in the images due to their limited size and ambiguous boundary. The lattice fringes with d spacings of 0.38 nm correspond to the (200) plane of PEEK. Also, sets of lattice fringes distributed in the direction of the tube axis in a disordered manner, indicating that the axis of the PEEK backbone is not parallel to the axis of MWCNT. This result reveals that the crystallization of PEEK on MWCNT may not follow the soft epitaxy mechanism mentioned above. Besides, the rigid PEEK chains cannot adjust their conformation as readily as the flexible polymers during the crystallization. After all, the detailed microstructure and interaction between the MWCNT and PEEK lamellae are still ambiguous and further work is necessary. At present, it remains a challenge to elucidate the mechanism of MWCNT induced crystallization of PEEK.

To investigate the PEEK-coated MWCNT colloidal stability in NMP, the zeta potential of the PEEK/MWCNT was monitored. Among the solvents of choices, pristine MWCNTs can only exhibit good dispersion in NMP with zeta potential <−40 mV. PEEK/MWCNT hybrid containing 20 wt % of MWCNT displays a zeta potential value of about −40 mV in a variety of solvents, including THF, chloroform, acetone, and NMP. This indicates that the PEEK layer on MWCNT effectively alters the surface state of the MWCNTs and improves its colloidal stability in many organic solvents. Combined with the above morphological analysis, interfacial crystallization of PEEK on MWCNT is demonstrated to be a good strategy for good dispersion of PEEK-coated MWCNTs in PEEK. PEEK/MWCNT powders were obtained through vacuum filtration from the above solution. Afterwards, PEEK/MWCNT thin films were successfully obtained by molding. The morphologies of PEEK/MWCNT at different MWCNT concentration levels are shown in FIG. 3. MWCNTs are uniformly dispersed in the PEEK matrix at all concentration up to 20 wt %, and no MWCNT agglomeration is observed. The loading of MWCNT in PEEK can be readily adjusted by changing the composition of PEEK to MWCNT ratio during the sample preparation. The above findings demonstrate the effectiveness of our approach to achieve good dispersion of MWCNTs in PEEK without a need for surfactant.

Crystallization Behavior

CNTs have been shown to be an effective nucleation agent for polymer crystallization. The effect of MWCNTs on the crystallization behavior of PEEK was also investigated using DSC. From non-isothermal DSC curves of PEEK and PEEK/MWCNT nanocomposites at low MWCNT concentrations (with a scanning rate of 20° C./min), it is evident that all the PEEK/MWCNT nanocomposites show a higher crystallization temperature and a narrower peak width. With an addition from 0.5% to 2% MWCNTs, Tc is increased from 15 to 25° C., respectively, compared to the neat PEEK. From the second heating scans of PEEK/MWCNT, both the melting point and crystallinity are decreased slightly when compared to neat PEEK. The annealing effect on the crystallinity of PEEK/MWCNT samples were also probed. All the samples exhibit a characteristic double-melting behavior after annealing at 280° C. for 2 h. The lower melting peak of each PEEK/MWCNT sample appears at the same temperature of 292° C. as the neat PEEK. The main melting peak shifts slightly to a lower temperature with increasing MWCNT concentration, which can be attributed to the heat sink and constraining effects of MWCNTs. Interestingly, the crystallinity calculated from both melting peaks for each sample is nearly identical. This result demonstrates that MWCNTs have little impact on crystallinity after annealing.

Figure 4A:
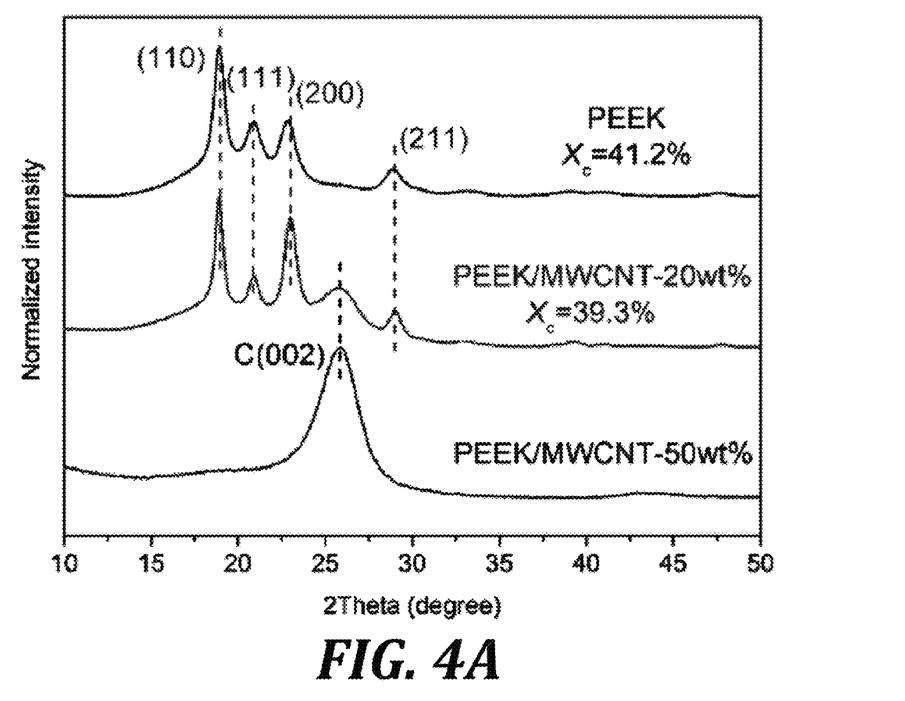
FIG. 4A illustrates XRD patterns and FIG. 4B-4D are DSC 1st heating (4B), cooling (4C), and 2nd heating curves (4D) of representative PEEK/MWCNT nanocomposites of the invention (PEEK/MWCNT at 20 wt % and 50 wt % of MWCNT loadings). Associated curves for neat PEEK are also included as a reference.
Figure 4B:
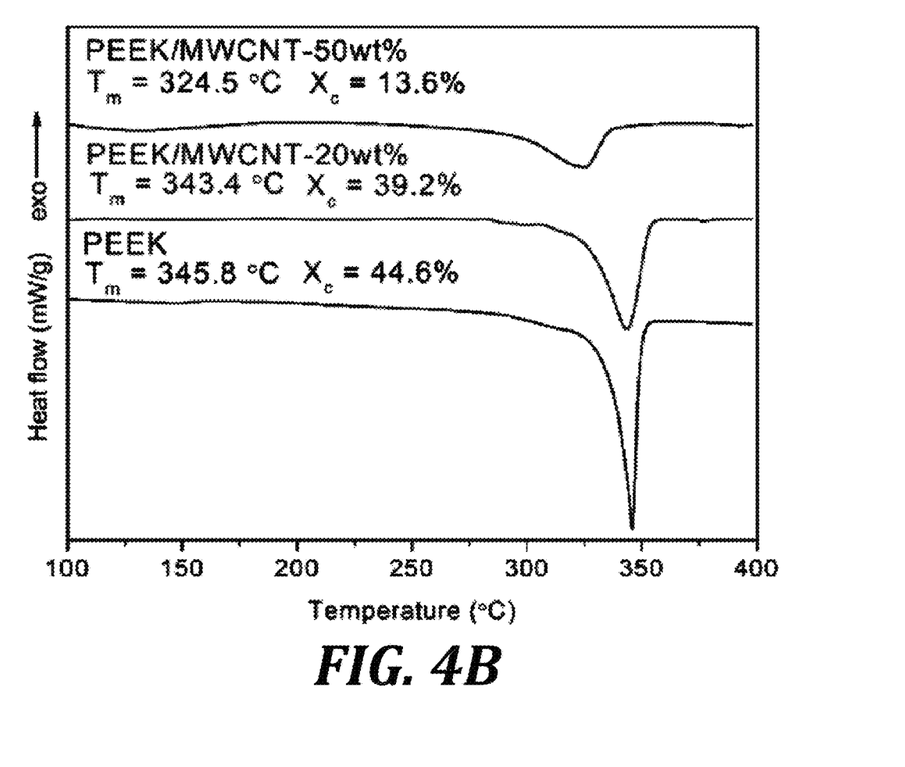
Figure 4C:
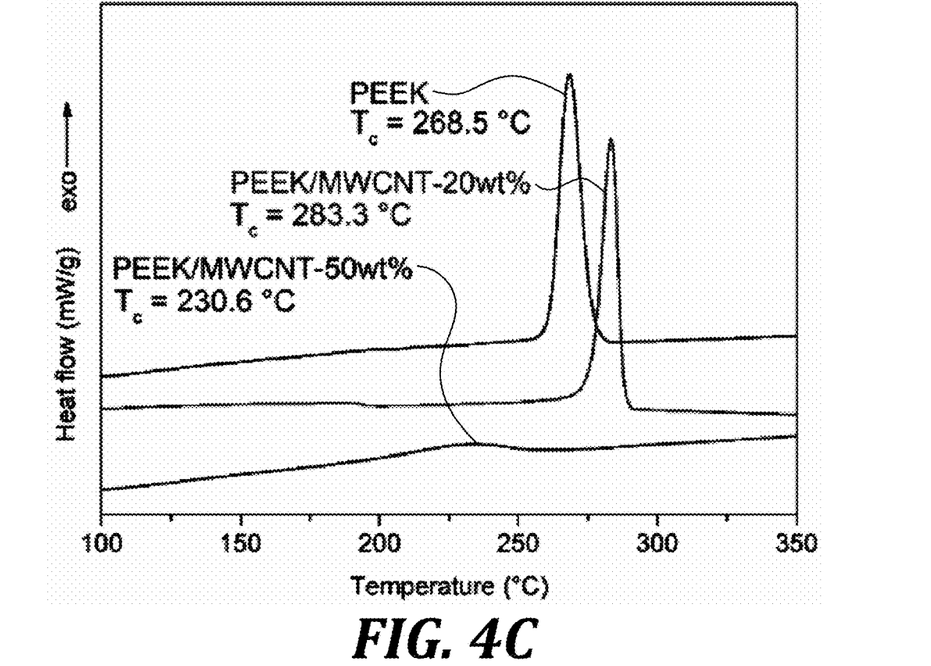
Figure 4D:
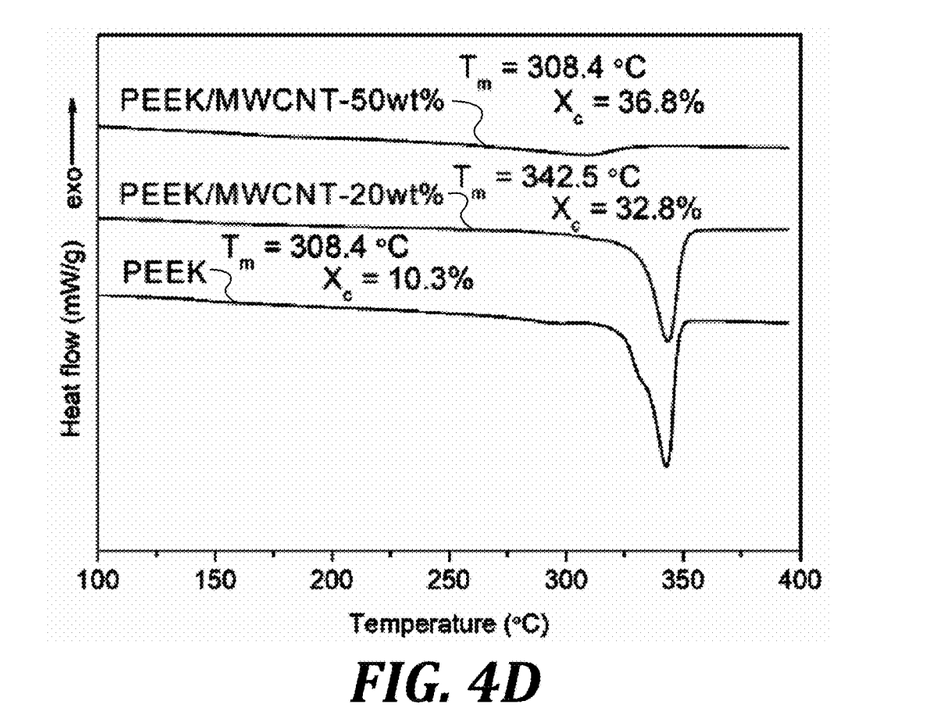

XRD was also utilized to characterize the crystalline structure of PEEK/MWCNT. As shown in FIG. 4A, PEEK/MWCNT-20 wt % exhibits all the characteristic diffraction peaks of a neat PEEK, which corresponds to (110), (111), (200), and (211) diffraction planes. It is noted that the peak at 25.8° is ascribed to the graphite structure of MWCNTs, not related to PEEK. The crystallinity of PEEK/MWCNT-20 wt % is estimated to be about 39%, which is nearly identical to the DSC results (FIG. 4B). Interestingly, there is only a broad hump for the PEEK/MWCNT-50 wt % system, without showing any characteristic PEEK diffraction peaks. This result agrees well with the DSC study (FIGS. 4C and 4D), suggesting that PEEK chains are highly constrained to the surface of MWCNTs at 50 wt % MWCNT loading and unable to form crystal structure. As mentioned earlier, PEEK chains are absorbed onto the axis of MWCNTs at 50 wt % loading, with a thickness of about 6 nm coating on MWCNT surfaces. The mobility of the coated PEEK chains is expected to be highly constrained by MWCNTs. Consequently, the crystallinity of the PEEK/MWCNT-50 wt % system becomes too low to be quantifiable.

Dynamic Mechanical Analysis

DMA was performed in tensile mode to study the dynamic mechanical behavior of PEEK and PEEK nanocomposites. Since the PEEK/MWCNT-50 wt % film is too brittle for mechanical testing, this system was not studied. With a MWCNT concentration of 20%, the storage modulus of PEEK increases by 85% at room temperature (Table 1). As the temperature goes above Tg, the reinforcing effect of MWCNTs becomes more pronounced. At 275° C., the storage modulus of PEEK/MWCNT-20 wt % is 4.25 times higher than that of the neat PEEK. Remarkably, as the temperature rises above the melting point of PEEK, PEEK/MWCNT-20 wt % exhibits a rubbery plateau modulus (FIG. 4A), which may be caused by the MWCNT network formation at high MWCNT loading. The tan delta curves shown in FIG. 4B imply that the PEEK/MWCNT-20 wt % possess a similar Tg as that of the neat PEEK. It is also interesting to note that the PEEK/MWCNT-20 wt % exhibits a skewed, broadened Tg peak toward the high temperature end. This is most likely due to the constraining effect of MWCNT on the amorphous PEEK chains.

TABLE 1

Storage modulus (E') and Tg data of PEEK and PEEK nanocomposites.

|  | Storage modulus @25° C. (GPa) | Storage modulus @275° C. (GPa) | $T_g$ (° C.) |
| --- | --- | --- | --- |
| PEEK | 3.27 | 0.16 | 160 |
| PEEK/MWCNT-20 wt % | 6.04 | 0.68 | 163 |

Figure 3A:
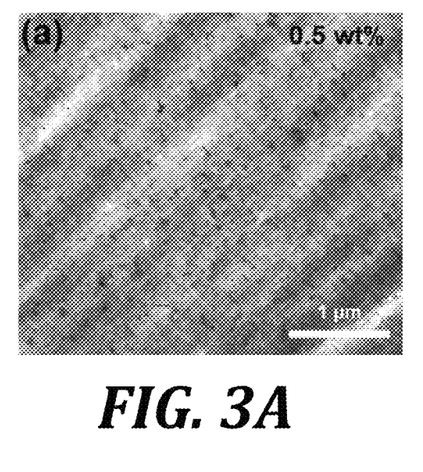
FIGS. 3A-3E are TEM images of representative PEEK/MWCNT nanocomposites of the invention at various MWCNT concentrations (0.5. 5.0, and 20 wt %) showing individually dispersed MWCNT at low-magnification (3A-3C) and at high-magnification (3D-3F).
Figure 3B:
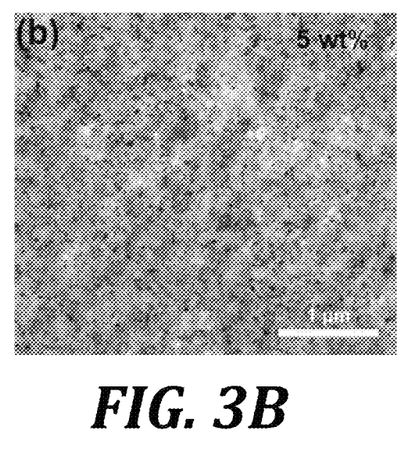
Figure 3C:
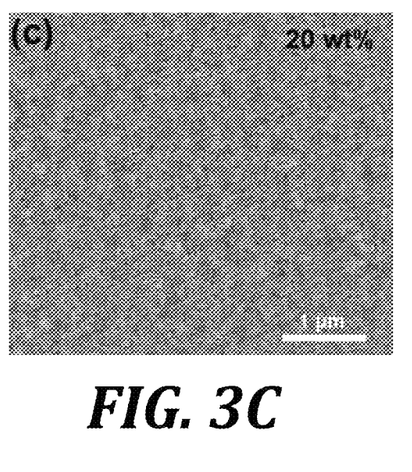
Figure 3D:
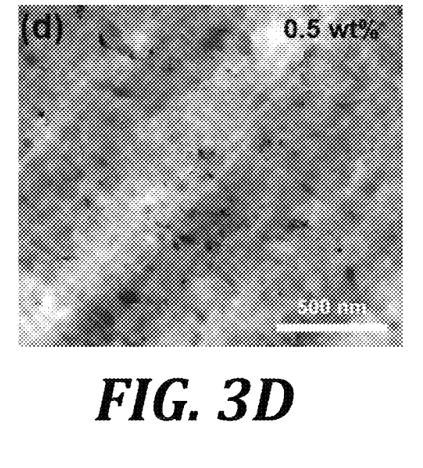
Figure 3E:
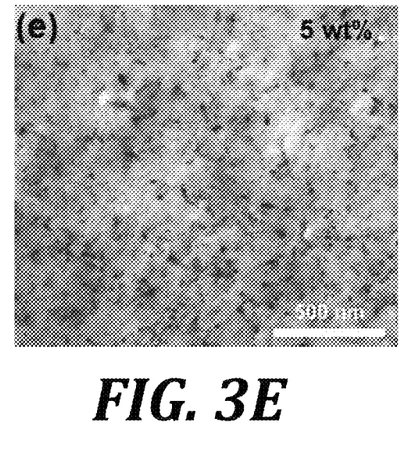
Figure 3F:
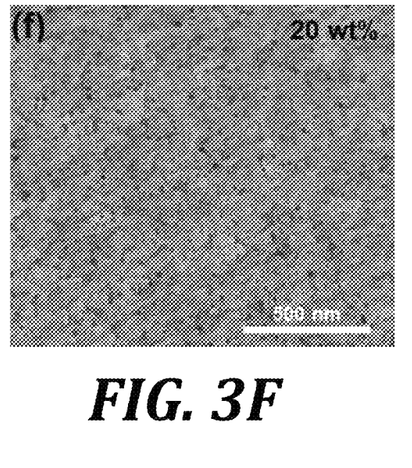
Figure 5A:
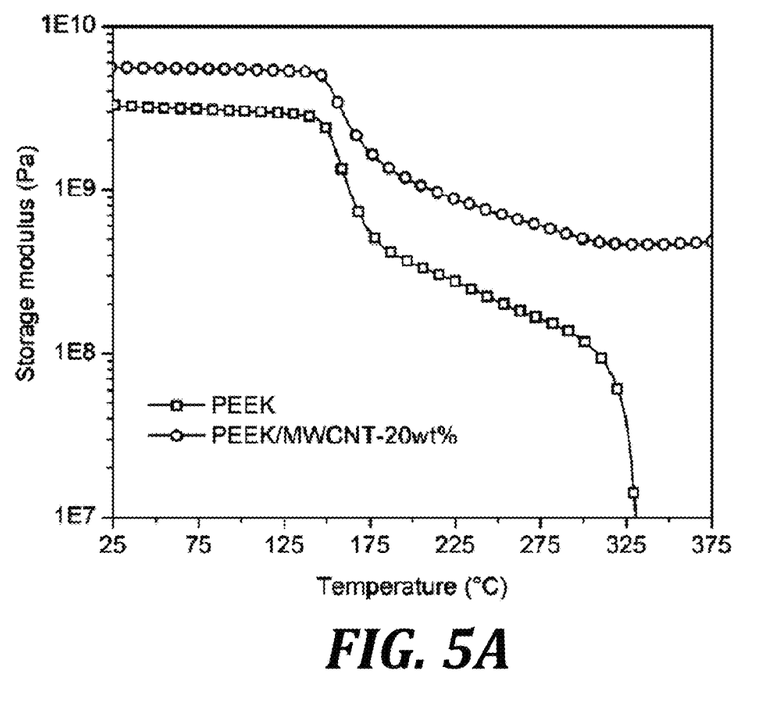
FIGS. 5A and 5B compare DMA curves of unfilled PEEK and a representative PEEK/MWCNT nanocomposite of the invention (PEEK/MWCNT-20 wt %).
Figure 5B:
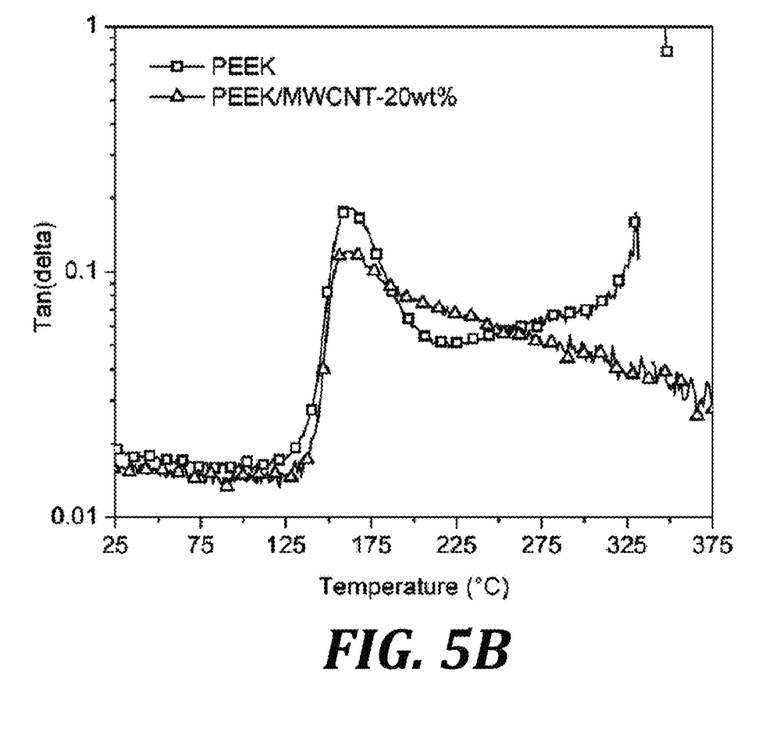
Figure 6:
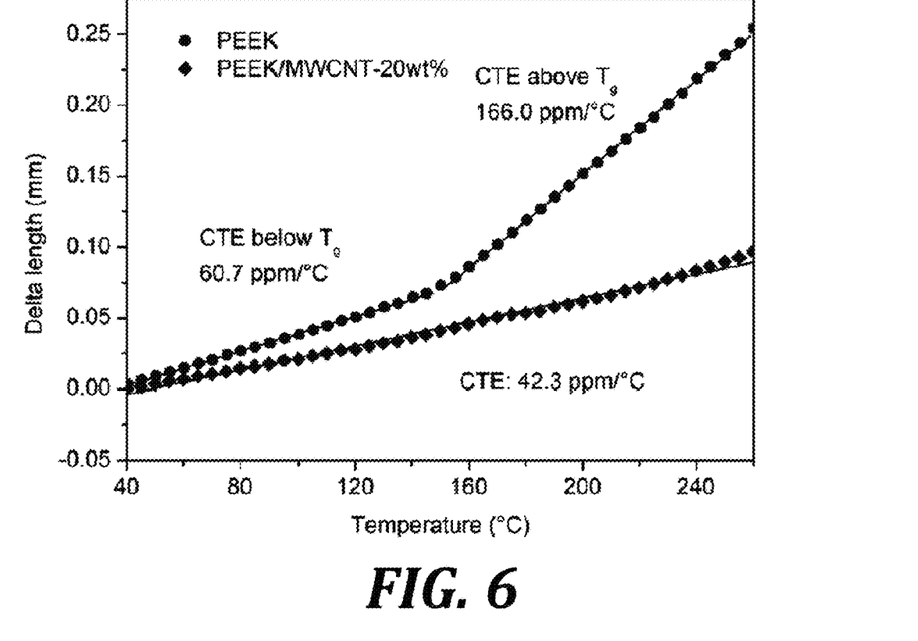
FIG. 6 compares film deformation as a function of temperature for PEEK and a representative PEEK/MWCNT nanocomposites of the invention PEEK nanocomposites.

The above phenomena have also been observed in other polymer nanocomposites with high CNT loadings. CNTs substantially alter the thermomechanical properties of the matrix polymer in several ways. First, they act as reinforcements to significant increase the storage modulus (FIGURE SA). Second, they induce crystallization near the interface. This retards the mobility of the nearby amorphous chains. The CTE of the PEEK/MWCNT nanocomposites was also measured. As MWCNTs exhibit a lower CTE (16-26 ppm/° C.) than that of PEEK, the CTE value of PEEK/MWCNT is expected to be greatly reduced. The linear thermal expansion curves of PEEK and PEEK/MWCNT are shown in FIG. 6. Typically, polymers exhibit a dramatic change in CTE behavior near Tg due to dramatically increased chain mobility. As expected, the neat PEEK has CTE values of 60.7 ppm/° C. and 160.0 ppm/° C. at temperatures below and above Tg, respectively. With an addition of 20 wt % MWCNTs, the nanocomposite shows a constant CTE value of 42.3 ppm/° C., from 40° C. to 260° C. Compared to neat PEEK, PEEK/MWCNT-20 wt % has 30% and 75% reduction in CTE below and above Tg, respectively. As discussed earlier, individual MWCNTs have been well dispersed throughout the PEEK matrix at high MWCNT loadings with an average inter-MWCNT distance of around 10 nm (FIG. 3C). This helps stabilize deformation upon heating.

Figure 7:
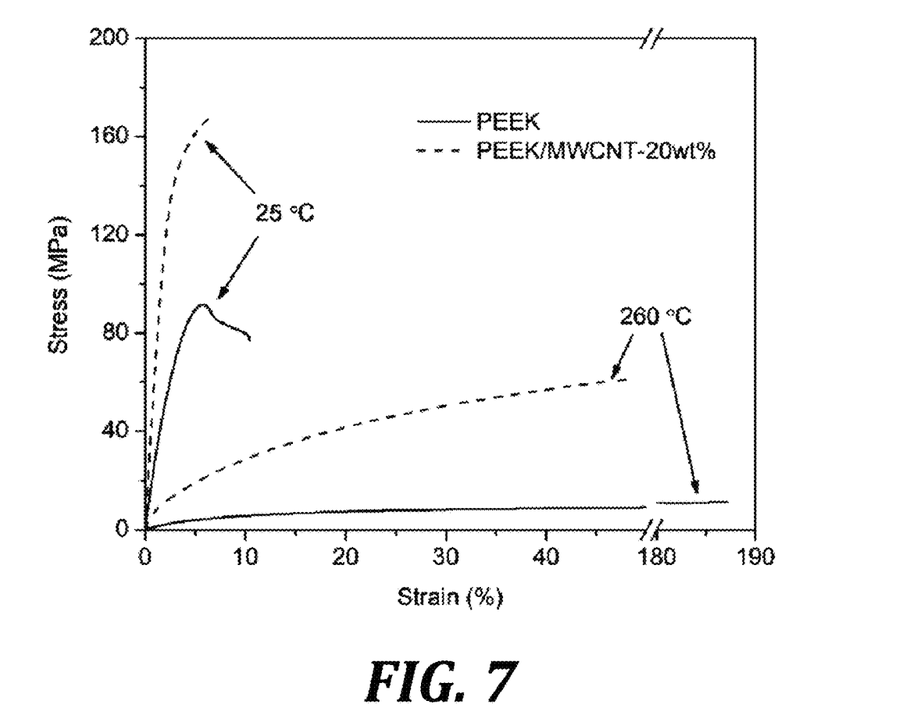
FIG. 7 compares engineering stress-strain curves of PEEK and a representative PEEK/MWCNT nanocomposite thin film of the invention (PEEK/MWCNT-20 wt %) at 25° C. and 260° C.

Tensile properties CNTs have been extensively used as a reinforcing filler for the improvement of the mechanical properties of polymers. FIG. 7 depicts the engineering stress-strain curves of the neat PEEK and PEEK/MWCNT-20 wt % obtained at 25° C. and 260° C., respectively. With the addition of MWCNTs, the nanocomposite exhibits a remarkable increase in Young's modulus as well as tensile strength (Table 2). At 25° C., PEEK/MWCNT-20 wt % possesses a Young's modulus of 7.0 GPa and tensile strength of 170 MPa, which give rise to increases over the neat PEEK by 90% and 105%, respectively. Remarkably, at 260° C., the Young's modulus and tensile strength improvements become 500% and 425%, respectively. The improvements in tensile properties are more pronounced at higher temperatures, which is consistent with our earlier findings in other polymer nanocomposites.

TABLE 2

Tensile properties of PEEK and PEEK/MWCNT-20 wt % at 25° C. and 260° C.

|  | Young's Modulus @25° C. (GPa) | Tensile strength @25° C. (MPa) | Young's Modulus @260° C. (GPa) | Tensile strength @260° C. (MPa) |
| --- | --- | --- | --- | --- |
| PEEK | 3.7 ± 0.1 | 90 ± 5 | 0.20 ± 0.03 | 12 ± 2 |
| PEEK/ MWCNT-20 wt % | 7.0 ± 0.2 (+90%) | 170 ± 8 (+105%) | 1.2 ± 0.1 (+500%) | 65 ± 3 (+425%) |

Figure 8A:
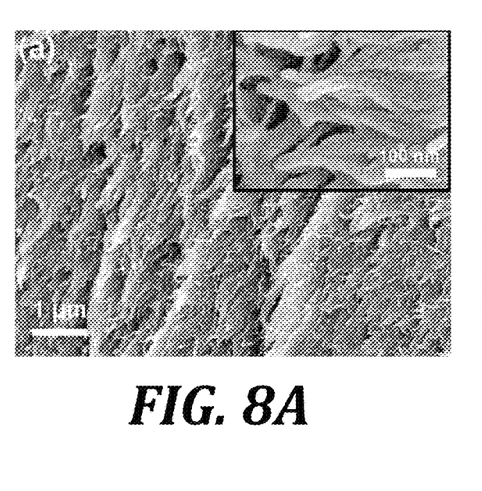
FIGS. 8A-8C illustrate the morphology of the fracture surface of a representative PEEK/MWCNT nanocomposite thin film of the invention (PEEK/MWCNT-20 wt % thin film): pristine surface (8A) and etched surface (8B). SEM image of pristine MWCNT (8C) is included as a reference.
Figure 8B:
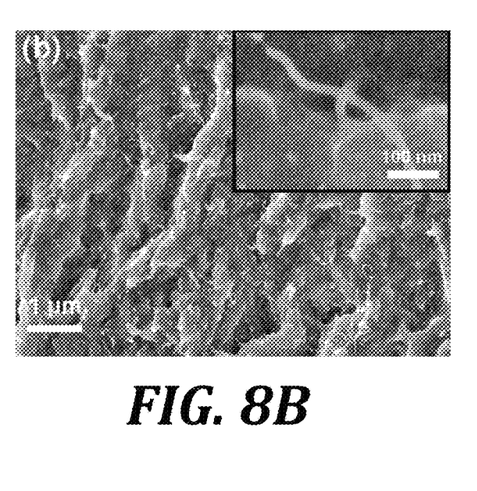
Figure 8C:
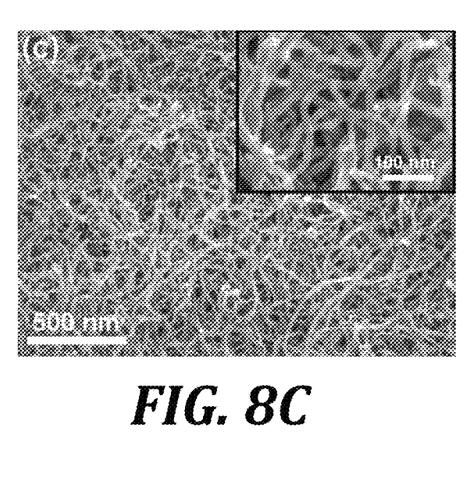

Generally, the Young's modulus of a polymer nanocomposite increases proportionally with increasing interfacial area between the polymer matrix and the reinforcing nanoparticles. On the other hand, tensile strength improvement is more difficult to achieve due to restricted chain mobility and the possible presence of nanoparticle aggregates. Strong interfacial adhesion and homogenous dispersion have been found to be necessary conditions to take full advantage of the extraordinary properties of CNTs for reinforcement. Moreover, most recent investigations in nanoparticle-reinforced semi-crystalline polymer nanocomposites have demonstrated that the presence of anchored interfacial crystallization leads to a strong interfacial adhesion and high load transfer efficiency between the polymer and nanoparticles. To learn about the interface adhesion between MWCNT and the anchored PEEK molecules, SEM images were taken on the tensile fracture surfaces of the PEEK/MWCNT-20 wt % sample (FIG. 8A), where a large number of nanotubes appear to have been pulled out. These MWCNTs are well distributed, indicating a good dispersion. The diameter of the pulled-out nanotubes is measured to be 25±3 nm. The same fracture surface was further etched by methanesulfonic acid to remove the coated PEEK on the pulled out MWCNT, which resulting in altered morphology (FIG. 8B). The diameter of the pulled-out nanotubes after acid etching becomes 16±2 nm, which is nearly identical to the diameter of the pristine MWCNT (FIG. 8C). These results indicate that a PEEK layer (about 5 nm) remains on the MWCNT surfaces after the tensile fracture. This implies that the adhesive strength between the anchored-PEEK molecules and MWCNT is much stronger than the cohesion strength between the anchored-PEEK and the PEEK matrix. Thus, it is evident that the interfacial adhesion between the anchored PEEK on MWCNT prepared by the method is sufficiently strong and lead to greatly improved mechanical and thermomechanical performance of PEEK.

Electrical Conductivity

Figure 9:
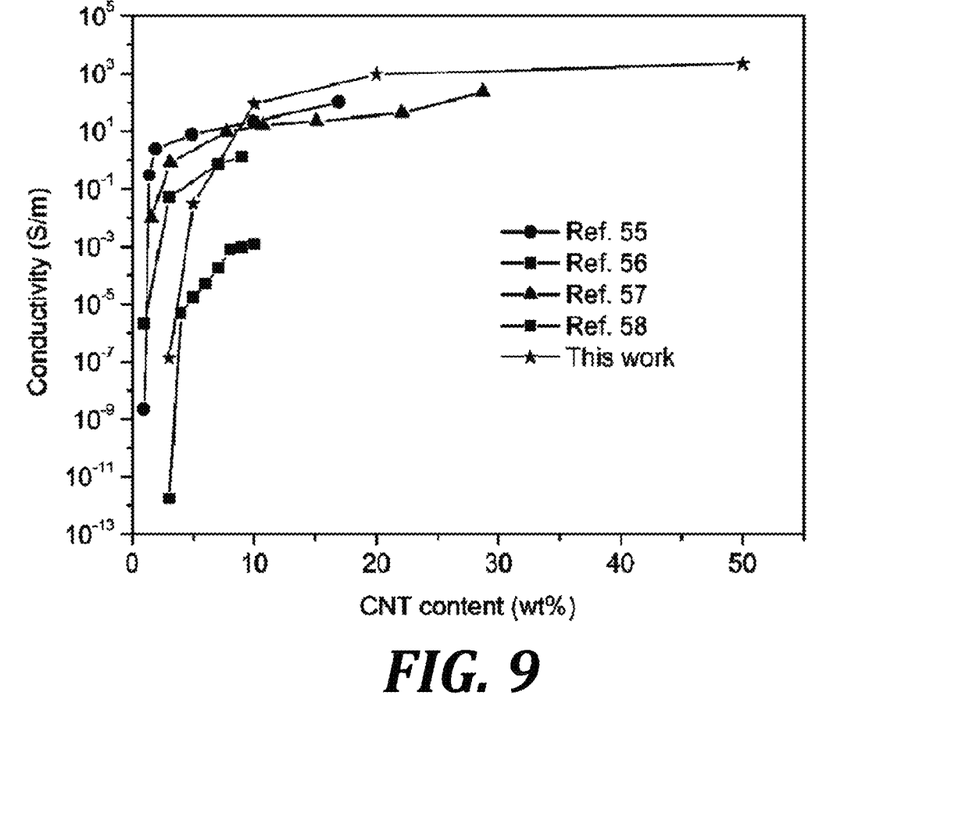

The electrical conductivity of PEEK/MWCNT thin films were measured by the four-probe method. As shown in FIG. 9, the electrical conductivity is dramatically increased as the MWCNTs content increases from 3 wt % to 50 wt %, which is in agreement with the percolation theory of the conductive polymer nanocomposites. The percolation threshold concentration of our PEEK/MWCNT is about 5 wt %, which is much higher than those reported in the literature. At a CNT loading of 0.5 wt %, the thickness of the PEEK layer on MWCNTs is about hundreds of nanometers. Most MWCNTs are coated by the PEEK layer which prevents direct contact between the adjacent MWCNTs, which leads to low electrical conductivity. As the MWCNT loading exceeds 5 wt %, the coated PEEK layer becomes much thinner. In this case, the adjacent MWCNTs can establish electrical conductivity via electron tunneling. The electrical conduction at the MWCNT-MWCNT junctions in PEEK becomes dominated by tunneling percolation. When the concentration of the MWCNTs exceeds the percolation threshold, the dispersion state of MWCNTs plays an important role. Well-dispersed MWCNTs form more pathways for electron conduction, guaranteeing a higher electrical conductivity.

Figure 10A:
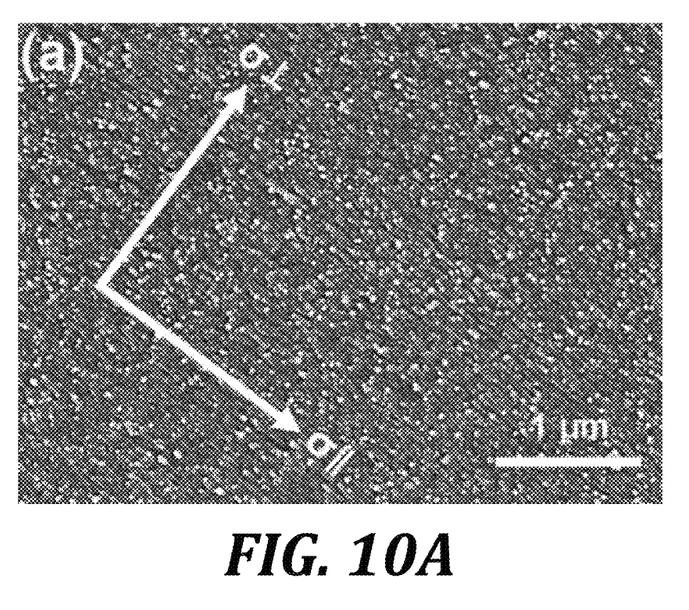
FIGS. 10A and 10B compare SEM images of the cross-section view of a representative PEEK/MWCNT nanocomposite thin film of the invention the (PEEK/MWCNT-20 wt % nanocomposite thin film) at low (10A) and high (10B) magnifications.
Figure 10B:
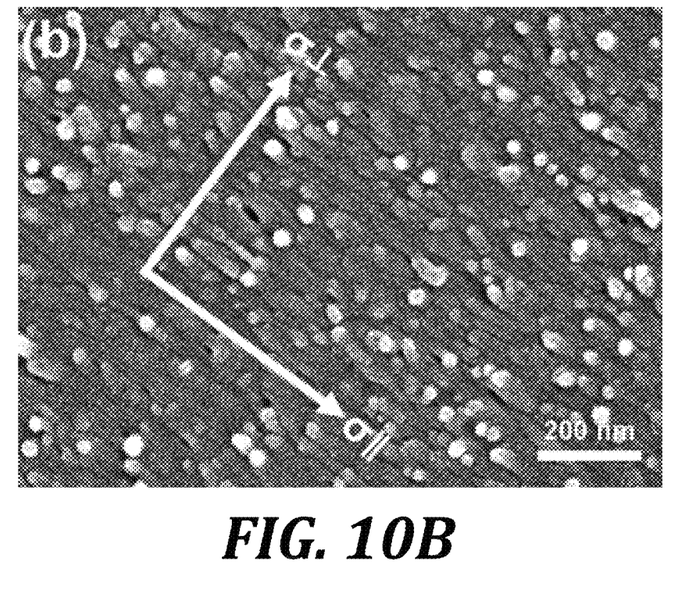

The electrical conductivity of PEEK/MWCNT in through-plane direction ($\sigma\perp$) was also measured ($\sigma\|$ is 3-4 orders of magnitude higher than $\sigma\perp$). This anisotropic electrical conductivity has been reported in various polymer nanocomposites having anisotropic alignment of CNTs. The SEM images of the cross-section of PEEK/MWCNT-20 wt % sample reveals that the axis of MWCNTs is nearly in parallel to the film surface (FIG. 10). This oriented MWCNT structure is likely caused by the vacuum filtration process during the thin film preparation. Along the in-plane direction, randomly distributed MWCNTs build numerous highly connected conductive pathways. While in the through-plane direction, MWCNTs orientation minimizes direct contacts among the neighboring MWCNTs which significantly increases the contact resistance, thus leading to a greatly reduced electrical conductivity.

It is always desirable to take full advantage of the attractive properties of each incorporated material component to achieve multi-functionalities in polymer nanocomposites. In the context of polymer nanocomposites, dispersion, interfacial adhesion, and the amount of nanoparticles included are the key factors that determine the attractiveness of the polymer nanocomposites, especially at high nanoparticle loading conditions. Interfacial crystallization is a promising strategy to prepare high-performance semi-crystalline polymer nanocomposites containing carbon-based nanofillers. This material design concept is the first of its kind to show effectiveness in improving mechanical and thermal properties of PEEK. In addition to CNTs, this method is likely applicable to other functional nanoparticles for multi-functional applications. The present method enables a homogeneous dispersion of MWCNTs into the PEEK matrix without any needs of surfactant or compatibilizer. The PEEK/MWCNT powders prepared as described herein possess consistent morphology and composition, rendering the ability to control the final nanocomposite structure and properties. The PEEK/MWCNT-20 wt % exhibits superior mechanical properties combined with excellent electrical conductivity, making it a promising candidate for electromagnetic interference shielding and lightning strike protection in aircraft applications. The method also serves as a masterbatch for a variety of engineering applications, including coating, additive manufacturing, and high-performance composite parts with complex geometries.

CONCLUSION

Polymer nanocomposites based on high melting temperature semi-crystalline polymers are difficult to prepare because of the limited means available to achieve good nanoparticle dispersion for greatly improved properties. In this study, we demonstrate an alternative strategy for preparation of high-performance PEEK/MWCNT nanocomposites via an interfacial crystallization approach. The utilization of polyetheretherketimine (PEEKt) to prepare PEEK nanocomposites eliminates the difficult solvent issues and enables solution mixing and subsequent crystallization of PEEK on MWCNTs. This strategy facilitates a homogeneous dispersion of pristine MWCNTs into the PEEK matrix without any need of surfactant or compatibilizer. Upon drying, the PEEK/MWCNT powder were then molded into various dimensions for tensile property and electrical conductivity measurements. As expected, significant improvements in both tensile properties and electrical conductivity are realized. The multi-functional PEEK/MWCNT nanocomposites that exhibit good dispersion of MWCNT in PEEK are ideal for applications in energy production field, electromagnetic shielding, electrochemical devices, and coatings under harsh conditions.

The present invention provides a novel fabrication strategy for preparation of high-performance PEEK/MWCNT nanocomposites via an interfacial crystallization approach. The utilization of PEEK precursor to prepare PEEK nanocomposites eliminates the difficult solvent issues and enables solution mixing and subsequent in-situ crystallization of PEEK on MWCNTs. PEEK/MWCNT nanocomposites were prepared and showed good dispersion and strong interfacial adhesion with PEEK at various MWCNT loadings up to 50 wt %. The PEEK/MWCNT fabricated by the above strategy exhibits unprecedented tensile performance and electric conductivity contributed by the individually dispersed MWCNTs with strong interfacial interaction between MWCNTs and PEEK. The present work shows the promise of using the interfacial crystallization approach for preparation of high-performance PEEK nanocomposites with multifunctionality.

As used herein, the term "about" refers to ±5% of the specified value.

The following example are provided for the purpose of illustrating, not limiting, the invention.

EXAMPLES

Materials

The raw material 4,4'-difluorobenzophenone was purchased from TCI America, and purified by recrystallization from ethanol. Hydroquinone was purchased from ACROS ORGANICS, and purified by recrystallization from toluene. Anhydrous potassium carbonate was purchased from Alfa Aesar, and dried at 120° C. under vacuum prior to use. Aniline was purchased from Alfa Aesar, and purified by vacuum distillation. Molecular sieves (3 Å) were purchased from Alfa Aesar. Hydrochloric acid, sulfolane, toluene, NMP, N,N-dimethylformamide (DMF), and methanol were purchased from VWR Chemicals, and used as received. Multi-walled carbon nanotubes (SWeNT® SMW100) were provided by SouthWest NanoTechnologies, Inc., and used as received. The MWCNT diameter distribution is 75% of tubes <9 nm and 90%<12.2 nm, with an average aspect with an average aspect ratio of 1000, and carbon content ≥98%.

Synthesis of N-phenyl(4,4'-difluorodiphenyl) Ketimine

The monomer N-phenyl(4,4'-difluorodiphenyl) ketimine was synthesized as follows. A mixture of 4,4'-difluorobenzophenone (21.82 g, 0.1 mol), 13.7 mL (0.15 mol) of aniline, 50 g of molecular sieve (3 Å), and 80 mL of toluene were poured into a 250 mL three-neck round-bottom flask equipped with a mechanical stirrer and a Dean-Stark trap. The mixture was heated under a nitrogen atmosphere and was refluxed for 24 h. The resulting mixture was cooled down to room temperature. After filtration, the solvent was evaporated under vacuum. The obtained product, N-phenyl (4,4'-difluorodiphenyl)ketimine, was finally recrystallized from methanol with a yield of 55% (w/w).

Synthesis of Polyether-Ether-Ketimine (PEEKt)

The ketimine, prepared as described above, was polymerized to a PEEK-ketimine using the following procedure. To a 250 mL three-neck flask (equipped with a mechanical stirrer and a Dean-Stark trap), 11.732 g (0.04 mol) of the ketimine monomer, 4.404 g (0.04 mol) of hydroquinone, 6.081 g (0.044 mol) of potassium carbonate, 20 mL of toluene, and 40 mL of sulfolane were added. The mixture was heated under a nitrogen atmosphere to 140° C. and maintained for 3 h for the removal of water. The polymerization was heated to 190° C. for 18 h. Afterward, the polymer solution was filtered and precipitated into methanol. The resulting solids were filtered, washed with hot methanol, and dried in vacuum to obtain PEEK-ketimine polymer. The obtained PEEK-ketimine shows good solubility in various common organic solvents, including THF, DMF, $CHCl_3$, NMP. SEC results reveal that PEEK-ketimine possesses Mw=54.1 kg/mol and PDI=2.4, indicating that the molecular weight of PEEK-ketimine is comparable to that of a typical commercial PEEK.

Characterization Methods

Optical microscopy (OM) was conducted using an Olympus optical microscope (BX60) under both bright field and crossed-polarization conditions. Scanning electron microscopy (SEM) images were acquired using a JEOL JSM-7500F Field Emission-SEM (FE-SEM).

Transmission electron microscopy (TEM) was performed using a JEOL 1200EX. A Leica microtome was utilized to prepare thin sections with 70-100 nm in thickness for TEM imaging.

Analytical size-exclusion chromatography (SEC) measurements were performed on a TOSOH EcoSEC (HLC-8320GPC) in THF solution at 40° C. through TSKgel SuperHM-M and TSKgel SuperH-RC columns to determine the weight-average molecular weight (Mw) of PEEKt.

UV-vis-IR absorption spectroscopy was carried out using a Shimadzu UV-3600.

Zeta potential of the MWCNT and PEEK/MWCNT suspensions were measured with a Malvern Zetasizer NanoZS system. X-ray diffraction (XRD) patterns were obtained using a Bruker D8 diffractometer with Bragg-Brentano θ-2θ geometry (40 kV and 40 mA), using a graphite monochromator with Cu Kα radiation.

Thermogravimetric analysis (TGA) analyses were carried out on a TA Instruments Q500 thermogravimetric analyzer. The temperature was increased from 30° C. to 800° C. at 10° C./min under a 20 mL/min $O_2$ flow. Differential scanning calorimetry (DSC) was carried out at various heating rates using TA Instruments Q20. For each PEEK/MWCNT sample, a heat-cool-reheat cycle was performed in the temperature range of from 25° C. to 400° C. with a scan rate of 20° C./min. The annealed samples were obtained by isothermal crystallization at 280° C. for 2 h using Q20.

Tensile tests and dynamic mechanical analysis were conducted using an RSA-G2 (TA Instruments) with a tensile fixture. Tensile tests were performed at 25° C. and 260° C.

using a rectangular geometry of 20 mm×3 mm×0.01 mm at a crosshead speed of 2 mm/min Dynamic mechanical analysis (DMA) was conducted in tensile mode at a strain amplitude of 0.05%, frequency of 1 Hz, and a heating rate of 5° C./min from room temperature to 350° C. The coefficient of thermal expansion was also measured using an RSA-G2. The displacement (ΔL) of samples was recorded as a function of temperature.

Electrical conductivity measurements were performed on the thin films with an Agilent Digital Multimeter (Agilent Technology, US) using a four-point-probe (Signatone, SP4-40045TBY) with 1.6 mm spacing. A voltmeter (Keithley 2000) was used to measure the voltage drop across the inner two probes. The conductivity was calculated by using the following formula:

$$\sigma = \frac{1}{\frac{\pi}{\ln(2)} \cdot \frac{\Delta V}{I} \cdot t \cdot K}$$

where σ is the electrical conductivity (S/m), V is the voltage drop measured across the inner two probes, I is the current through the outer two probes, t is the thickness of the film, and a correction factor that depends on the diameter and thickness compared to the probe spacing.

Reference Example

PEEK Control with No Added CNT

PEEK-ketimine was converted to PEEK using the following procedure. To a 40 mL glass vial, PEEK-ketimine powder (1.25 g) was weighed and mixed with NMP (11.25 g) to yield a 10 wt % polymer solution. Once the solution became homogeneous, 1 M HCl solution (3.44 mL) was added and turned the solution into cloudy appearance within several minutes. Then, the precipitate was collected and washed with NMP, water, and methanol, respectively. After the removal of residual acid and by-products, the powder was suspended in various solvent for further characterization.

Example 1

Synthesis of PEEK-MWCNT Nanocomposite (10 wt % MWCNT)

To a 40 mL glass vial, 40 mg MWCNT was weighed and mixed with 35 mL NMP. This mixture was then sonicated in a water bath sonicator at room temperature for 45 minutes. Then, the obtained MWCNT suspension was centrifuged at 7,000 rpm for 10 minutes to remove large aggregates. The concentration of MWCNT suspension was determined based on the calibration curve measured by UV-Vis absorption spectra. The calibration curve was generated by measuring the absorbance of a series of MWCNT suspensions with known concentrations. The concentrations were determined by vacuum filtration of a known volume of suspension and weighing the resultant film. The absorbance at wavelength of 670 nm was then used to determine the concentration of MWCNT from the calibration curve.

Afterwards, 2.25 g of PEEK-ketimine solution (10 wt %) was mixed with the MWCNT suspension (20 mg in 20 mL NMP). Once this mixture became homogeneous, 1 M HCl solution (0.62 mL) was added. A precipitate formed (190 mg) that was collected and washed with NMP, water, and methanol.

Example 2

Synthesis of PEEK-MWCNT Nanocomposite (20 wt % MWCNT)

To a 40 mL glass vial, 40 mg MWCNT was weighed and mixed with 35 mL NMP. This mixture was then sonicated in a water bath sonicator at room temperature for 45 minutes. Then, the obtained MWCNT suspension was centrifuged at 7,000 rpm for 10 minutes to remove large aggregates. The concentration of MWCNT suspension was determined based on the calibration curve measured by UV-Vis absorption spectra.

Afterwards, 2 g of PEEK-ketimine solution (10 wt %) was mixed with the MWCNT suspension (40 mg in 40 mL NMP). Once this mixture became homogeneous, 1 M HCl solution (0.55 mL as added. A precipitate formed that was collected and washed with NMP, water, and methanol.

Example 3

Synthesis of PEEK-MWCNT Nanocomposite (50 wt % MWCNT)

To a 40 mL glass vial, 40 mg MWCNT was weighed and mixed with 35 mL NMP. This mixture was then sonicated in a water bath sonicator at room temperature for 45 minutes. Then, the obtained MWCNT suspension was centrifuged at 7,000 rpm for 10 minutes to remove large aggregates. The concentration of MWCNT suspension was determined based on the calibration curve measured by UV-Vis absorption spectra.

Afterwards, 1.25 g of PEEK-ketimine solution (10 wt %) was mixed with the MWCNT suspension (100 mg in 100 mL). Once this mixture became homogeneous, 1 M HCl solution (0.35 mL) was added. A precipitate formed that was collected and washed with NMP, water, and methanol.

Example 4

Preparation of PEEK-MWCNT Thin Film

A portion of the PEEK-MWCNT (150 mg) from the previous example was dispersed in DMF to a concentration of 2.5 mg/mL. The suspension was poured into a vacuum filtration system using a 0.45 μm nylon membrane filter (Foxx Life Sciences). Additional vacuum was applied for another 30 min. The thin film was removed from the filter and placed in a vacuum oven to remove any residual solvent before the final molding process. Afterwards, the dried sample was sandwiched between two metal plates with polyimide release films and spacers. The sample was molded in a muffle furnace at a heating rate of 0.5° C./min and held for 30 min at 360° C. During this process, a compressive force (10 N) was applied to facilitate the densification of PEEK/MWCNT thin film. Finally, the furnace was turned off and slowly cooled to room temperature. The resultant thin film had a thickness of about 150 μm.

Mechanical tests using DMA (dynamic mechanical analyzer) showed that PEEK/MWCNT (20 wt %) had a significantly higher modulus at room temperature (85% greater) and at 275° C. (500% greater) compared to the PEEK control film. The tensile strength was also much improved (90% greater at 25° C.; 425% greater at 275° C.) compared to the PEEK control film. The coefficient of thermal expansion (CTE) was also significantly lower. For the PEEK control film, the CTE was 60.7 ppm/° C. from room temperature to 140° C. and 160 ppm/° C. from 160 to 250° C. The surface conductivity of the PEEK-MWCNT was also excellent (91.2±1.6 S/m at 10 wt %; 951.8±0.4 S/m at 20 wt %; 2205±5 S/m at 50 wt %).

The embodiments of the invention in which an exclusive property or privilege is claimed are defined as follows:

1. A polymer/carbon nanotube nanohybrid, comprising a poly(ether ether ketone) and a multi-walled carbon nanotube,
   wherein the nanohybrid includes about 20 weight percent multi-walled carbon nanotube based on the total weight of the nanohybrid,
   wherein the multi-walled carbon nanotube has a long axis and a circumference, and
   wherein the poly(ether ether ketone) is crystalline and forms a plurality of bands disposed around the circumference of the multi-walled carbon nanotube thereby forming ring-like crystalline polymer structures along the long axis of the multi-walled carbon nanotube.

2. A molded product, comprising the polymer/carbon nanotube nanohybrid of claim 1.

3. A 3D-printed product, comprising the polymer/carbon nanotube nanohybrid of claim 1.

4. A blended polymer product, comprising the polymer/carbon nanotube nanohybrid of claim 1.

5. A particle, comprising the polymer/carbon nanotube nanohybrid of claim 1.

6. A thin film, comprising the polymer/carbon nanotube nanohybrid of claim 1.

7. The thin film of claim 6 having an anisotropic electrical conductivity.

8. A composition, comprising a plurality of the polymer/carbon nanotube nanohybrids of claim 1.

9. The composition of claim 8 having an electrical conductivity of 951.8 S/m.

10. The composition of claim 8 having a Young's Modulus at 25° C. (GPa) that is at least about 50-90% greater than for poly(ether ether ketone).

11. The composition of claim 8 having a tensile strength at 25° C. (MPa) that is at least about 50-105% greater than for poly(ether ether ketone).

12. The composition of claim 8 having a Young's Modulus at 260° C. (GPa) that is at least about 100-500% greater than for poly(ether ether ketone).

13. The composition of claim 8 having a tensile strength at 260° C. (MPa) that is at least about 100-500% greater than for poly(ether ether ketone).

14. The composition of claim 8 having an electrical conductivity in S/m that is at least about 100-500% greater than for poly(ether ether ketone).

* * * * *